(12) United States Patent
Matsumura et al.

(10) Patent No.: US 6,666,899 B2
(45) Date of Patent: Dec. 23, 2003

(54) METHOD OF MANUFACTURING ELECTRODE PLATES FOR BATTERIES

(75) Inventors: Jun Matsumura, Otsu (JP); Hiroshi Inoue, Toyohashi (JP); Mitsugu Takaki, Toyohashi (JP); Noriyuki Fujioka, Kosai (JP); Munehisa Ikoma, Toyohashi (JP); Kohei Suzuki, Yao (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 66 days.

(21) Appl. No.: 09/788,538

(22) Filed: Feb. 21, 2001

(65) Prior Publication Data

US 2001/0014999 A1 Aug. 23, 2001

(30) Foreign Application Priority Data

Feb. 22, 2000 (JP) .......................... 2000-044103
Apr. 14, 2000 (JP) .......................... 2000-113066

(51) Int. Cl.$^7$ ........................... H01M 4/80; B23P 15/00
(52) U.S. Cl. ................................ 29/623.5; 29/2
(58) Field of Search .................. 29/2, 623.5; 429/235, 429/237

(56) References Cited

U.S. PATENT DOCUMENTS 5,655,295 A    8/1997    Sugikawa

FOREIGN PATENT DOCUMENTS

| JP | 55124958 | 9/1980 |
|----|----------|--------|
| JP | 56-86460 | 7/1981 |
| JP | 61285658 | 12/1986 |
| JP | 63307665 | 12/1988 |
| JP | 1-120761 | 5/1989 |
| JP | 7-73878  | 3/1995 |
| JP | 9-7591   | 1/1997 |
| JP | 9-171821 | 6/1997 |
| JP | 11339798 | 12/1999 |

OTHER PUBLICATIONS

English Language Abstract of JP 61–285658.
English Language Abstract of JP 7–73878.
English Language Abstract of JP 9–7591.
English Language Abstract of JP 9–171821.
English Language Abstract of JP 11–339798.
English Language Abstract of JP 55–124958.
English Language Abstract of JP 1–120761.
English Language Abstract of JP 63–307665.
English Language Abstract of JP 56–86460.
English Language Translation of JP Appln. No. H01–120761.

*Primary Examiner*—Patrick Ryan
*Assistant Examiner*—Gregg Cantelmo
(74) *Attorney, Agent, or Firm*—Greenblum & Bernstein, P.L.C.

(57) ABSTRACT

After joining strips of lead plates in a lengthwise direction to a strip of porous metal sheet having a three-dimensional structure, the metal sheet is rolled entirely or in the vicinity of the lead plates. The porous metal sheet is then cut into several electrode substrates, which are coated with active materials and further cut into several electrode plates having a lead plate on one side thereof.

2 Claims, 9 Drawing Sheets

METHOD OF MANUFACTURING ELECTRODE PLATES FOR BATTERIES

BACKGROUND OF THE INVENTION

1. Field of the Invention

The present invention relates to a method of manufacturing electrode plates for batteries.

2. Description of the Related Art

There has been proposed a new design for nickel metal hydride batteries in which a number of electrode plates are accommodated together with electrolyte within a prismatic battery case having an open top end which is closed by a lid member integrally with the case. The electrode plates include positive electrode plates made of metal foam substrate containing Ni and negative electrode plates made of perforated metal substrate of Ni, coated with an active material containing hydrogen-absorption alloy powder in the form of a paste. The positive electrode plates are covered with bag-shaped separators made of polypropylene non-woven cloth having openings on one side, so that when these electrode plates are alternately stacked upon one another, the separators are interposed between each of the positive electrode plates and negative electrode plates.

Side edges on one side of the positive electrode plates and those of the negative electrode plates are protruded outwards in opposite directions, and these protruded side edges of the electrode plates constitute respective lead sections. The lead sections of the positive electrode plates are composed of the protruded side edges of compressed metal foam substrate, to one side of which lead plates are welded by seam welding or ultrasonic welding. The lead sections of the negative electrode plates are composed of the protruded side edges of perforated metal substrate, which are not coated with the active material. Collector plates made of nickel sheet or nickel-plated steel sheet are abutted perpendicularly on both sides of the positive and negative electrode plates, and welded to the respective lead sections.

Figure 14:
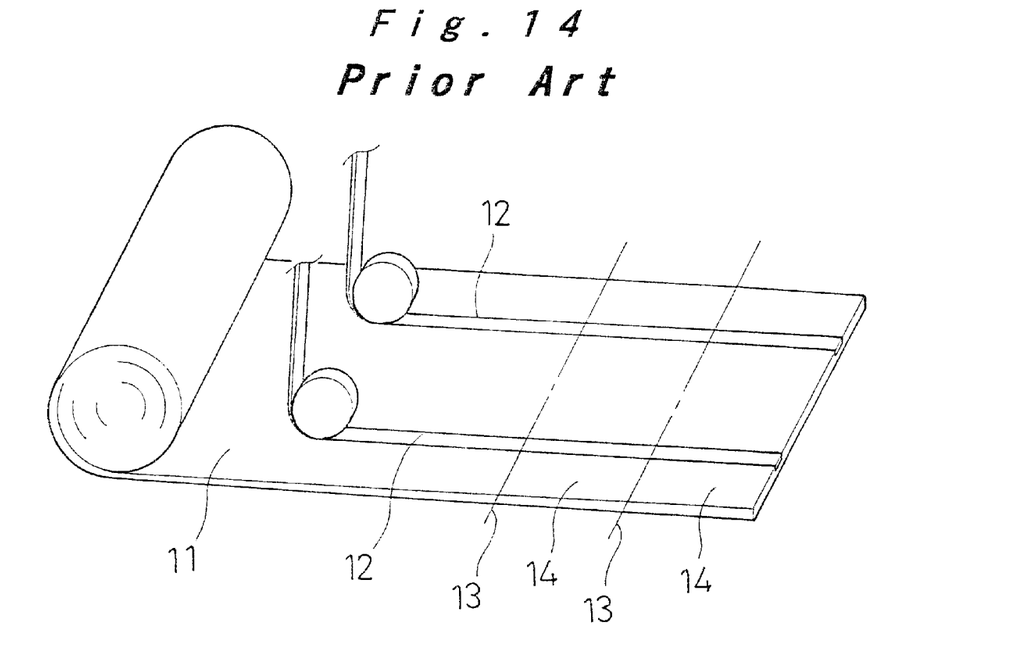
FIG. 14 is a perspective view illustrating a method of manufacturing positive electrode substrates according to a prior art example.
Figure 15:
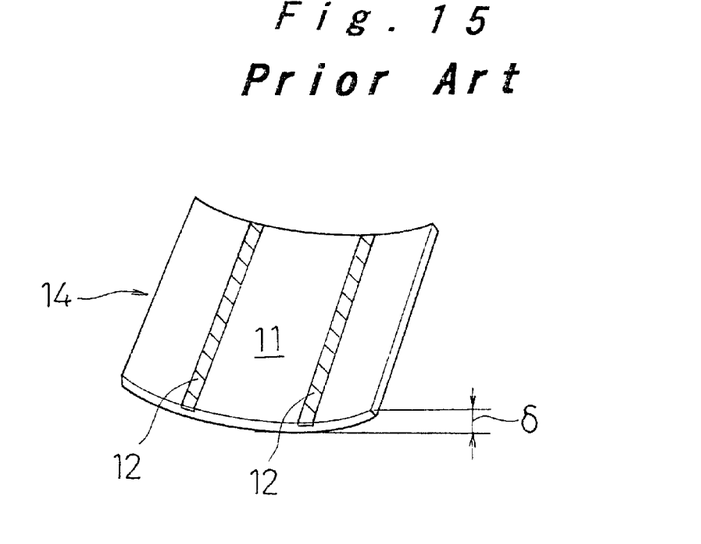
FIG. 15 is a perspective view of a positive electrode substrate obtained by the method illustrated in FIG. 14.

The positive electrode plates are fabricated as described below with reference to FIG. 14. First, lead plates 12 are joined at one or a plurality of locations with suitable separation in a widthwise direction of a strip of metal foam substrate 11 containing nickel. The metal foam substrate 11 is then cut at cutting lines 13 at intervals of a suitable length, whereby electrode substrates 14 as shown in FIG. 15 are obtained. These electrode substrates 14 are coated with active material and dried, and are further cut to predetermined dimensions.

As shown in FIG. 15, considerable warp δ is observed in the electrode substrates 14 after being cut from the metal foam substrate 11. This is because the metal foam substrate 11 is compressed at portions where the lead plates 12 are welded, and subjected to tension towards these joints. The electrode substrate 14 cannot be coated with active material uniformly because of such warp δ, resulting in defects due to variations in the filling amount of active material. Such warping of electrode substrates also causes various problems in the transfer system from one to another of various process steps such as feeding of substrates, filling of active material, drying of substrates and laminating of electrode plates.

Figure 16:
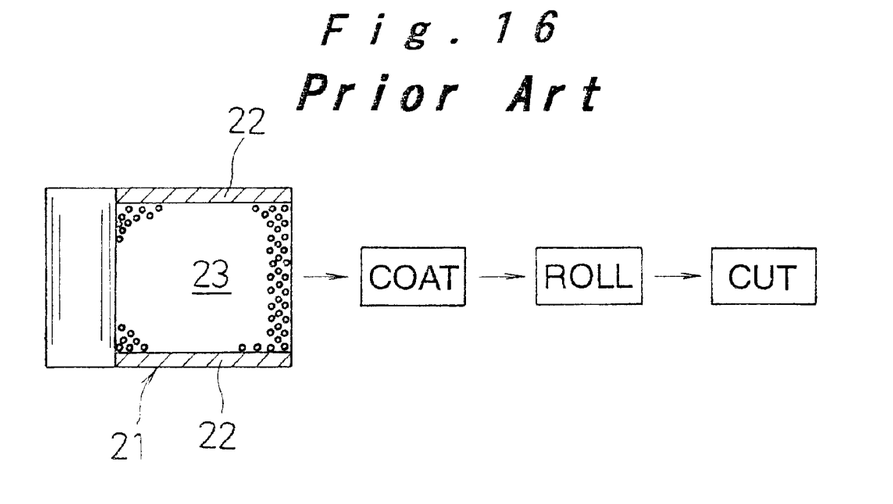
FIG. 16 is a perspective view illustrating a method of manufacturing negative electrode substrates according to a prior art example.

Negative electrode plates are fabricated generally as illustrated in FIG. 16. A strip of perforated metal sheet 21, having solid portions 22, 22 on both side edges and a punched portion 23 between these solid portions 22, 22 where a number of pores are formed, is coated with a mixture of negative electrode active materials only on the punched portion 23, rolled, and cut to suitable length.

Figure 17:
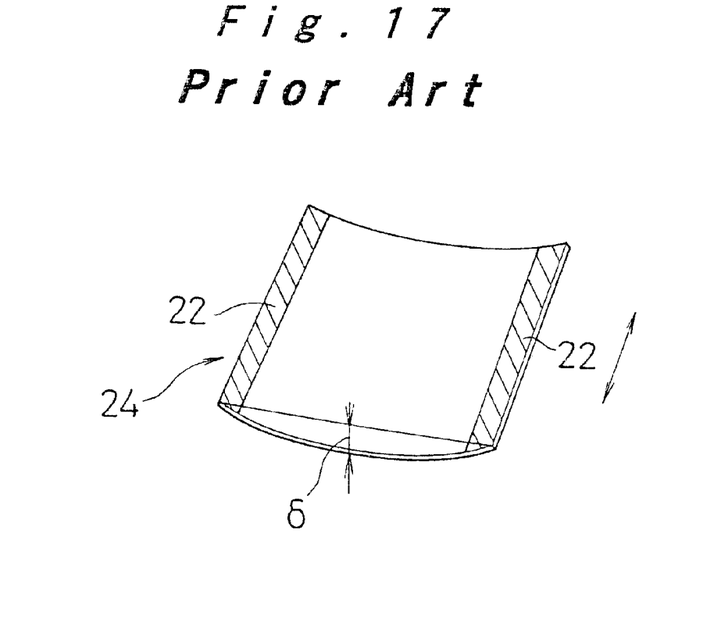
FIG. 17 is a perspective view of a negative electrode substrate obtained by the method illustrated in FIG. 16.

When rolling the perforated metal sheet 21 in directions indicated by the arrow in FIG. 17, it cannot stretch uniformly because of the solid portions 22, 22 on both side edges, as a result of which considerable warp δ is observed in the resultant electrode substrate 24 as shown in FIG. 17. This causes defects and short-circuiting resulting from peeling of active material applied on the substrate, and also causes various other problems similarly to the case with the positive electrode plates.

In view of the above problems of the prior art, an object of the present invention is to provide an improved method of manufacturing electrode plates for batteries.

SUMMARY OF THE INVENTION

The present invention is generally a method of manufacturing electrode plates for batteries, wherein, after joining at least one strip of lead plate in a lengthwise direction to a strip of porous metal sheet having a three-dimensional structure, the porous metal sheet is rolled entirely or in the vicinity of the strip of lead plate. The porous metal sheet is then cut to a predetermined length for obtaining a plurality of electrode substrates, which are coated with active materials for the battery and further cut to a predetermined length for obtaining electrode plates such that the resultant electrode plates have the lead plate on one side thereof. The porous metal sheet is rolled, entirely or in the vicinity of the strip of lead plate, so as to correct stress or strain generated by the tension towards the portions where lead plates have been welded to the porous metal sheet. Therefore, the electrode substrates obtained by dividing this porous metal sheet are free of warping, and they can be coated with electrode active materials uniformly. Also, any troubles during the transfer of the electrode substrates caused by the warp or deformation thereof are prevented.

In another embodiments of the invention, rolling is performed not to the porous metal sheet but to the plurality of electrode substrates after joining the strip of lead plate to the porous metal sheet and cutting the porous sheet into separate pieces of electrode substrates. The electrode substrates may be rolled entirely or only in the vicinity of the lead plate, for obtaining the same or similar effects as described above.

Another embodiment of the present invention is a method of manufacturing electrode plates for a battery, wherein, a strip of porous metal sheet, including perforated portions wherein a large number of pores are formed, solid portions where no such pores are formed on both side edges thereof, and at least one solid row between said solid portions on both side edges, is coated with a mixture of active materials for the battery, rolled, and cut into a plurality of substrates. These substrates are further cut into separate pieces of electrode plates respectively having solid portions on both side edges thereof. Since the porous metal sheet has at least one row of solid portion between the solid portions on both sides thereof, when it is rolled, there is only very little difference in the stretch of the metal sheet in the middle portion and on both side edges. Therefore, the electrode substrates obtained by dividing this metal sheet are free of warping, and they can firmly hold the electrode active materials coated thereon. Thereby, defects of electrode plates resulting from peeling of active material, short-circuits, and troubles when inserting the electrode plates into battery cases are all prevented.

The substrates may be cut into separate pieces of electrode plates such that the electrode plates respectively have solid portions on both side edges thereof and at least one solid row between said solid portions on both side edges.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE INVENTION

Preferred embodiments of the method of manufacturing electrode plates for batteries according to the present invention will be hereinafter described with reference to FIG. 1 to FIG. 8.

Figure 1:
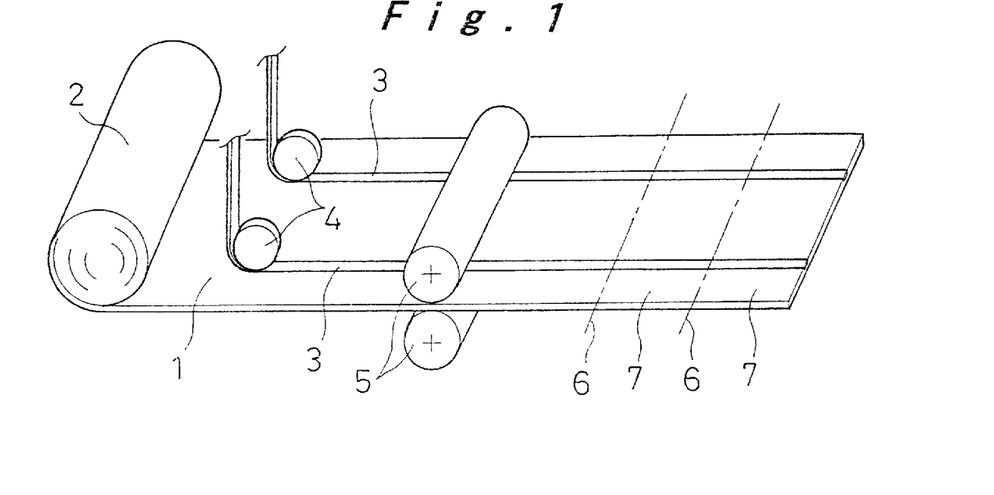
FIG. 1 is a perspective view schematically illustrating a step of manufacturing positive electrode substrates in accordance with one embodiment of the present invention.

In FIG. 1, reference numeral 1 represents a relatively wide strip of porous metal article having a three-dimensional structure such as metal foam primarily containing nickel, which is a raw material of the positive electrode plates for a nickel metal hydride battery. The strip of porous metal article 1 is supplied in the form of a coil 2. One or a plurality of strip(s) of lead plates 3 is/are joined to the porous metal article 1 paid out from the coil 2 at suitable intervals in a widthwise direction. The strips of lead plates 3 are seam-welded to the porous metal article 1 by applying electricity thereto and at the same time compressing the lead plates 3 onto the porous metal article 1 by means of one or a plurality of roll electrodes 4. Ultrasonic welding can also be performed conjointly with or instead of the seam welding.

The strip of porous metal article 1 with the lead plates 3 joined thereto is then rolled with a pair of rolls 5 to a predetermined thickness, whereby local stress or strain generated in the vicinity of the lead plates 3 is eliminated and the porous metal article 1 completely flattened.

Thereafter, the porous metal article 1 is cut at cutting lines 6 provided at predetermined suitable intervals, for obtaining a number of electrode substrates 7. Since the porous metal article 1 has been flattened out by rolling after joining the lead plates 3 thereto, there is no local stress or strain in the resultant electrode substrates 7 in the vicinity of the lead plates 3, and therefore no warping is observed therein.

The electrode substrates 7 thus obtained are continuously transferred to the following steps wherein they are coated with active materials, then dried, laminated, and divided to a predetermined size, whereby positive electrode plates in predetermined shape and size having lead sections on one side thereof are obtained. These electrode plates are further transferred to an assembly step in which they will be assembled into electrode plate groups.

Since the electrode substrates 7 obtained in accordance with this embodiment of the invention are free of warping, there can be no wide variations in the amount of active material applied onto the substrates. Also, troubles are less likely to happen during the transfer of the electrode substrates, and the operation rate of the production line is thereby enhanced.

Next, another embodiment of the present invention is described with reference to FIG. 2A and FIG. 2B. In the description of the following embodiment, structural elements which are the same as in the first embodiment are given the same reference numerals and further description is omitted, only the points of difference being described.

Figure 2A:
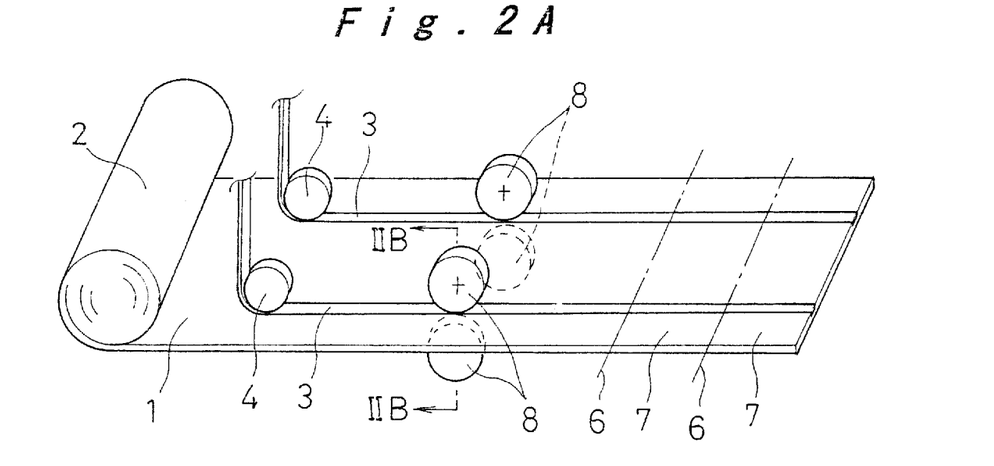
FIG. 2A and FIG. 2B illustrate a step of manufacturing positive electrode substrates in accordance with another embodiment of the present invention, FIG. 2A being an overall perspective view, and FIG. 2B being a cross-sectional view seen along the arrows IIB to IIB of FIG. 2A.
Figure 2B:
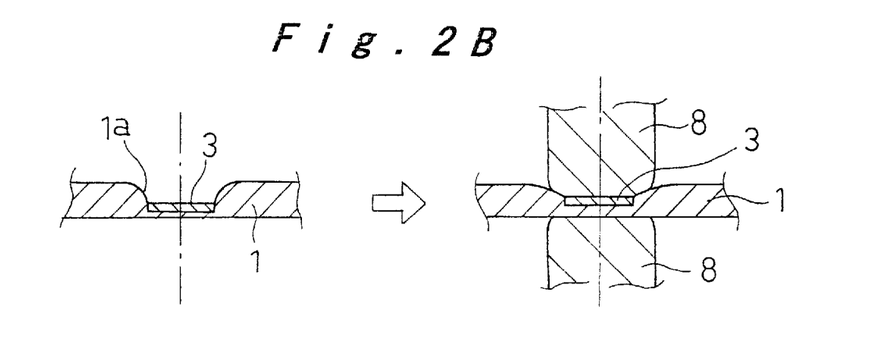

In this embodiment, as shown in FIG. 2A, after joining lead plates 3 to the porous metal article 1, only the vicinity of the lead plates 3 is rolled with a pair of rolls 8. As shown in detail in FIG. 2B, these rolls 8 have a width slightly greater than the width of the lead plates 3 and are formed such that their diameter gradually decreases at both side edges. Accordingly, when rolled with these rolls 8, the portions in the porous metal article 1 on either side of the lead plates 3 are smoothly flattened to substantially the same thickness of the lead plates or slightly greater than that. More specifically, before rolling, the porous metal article 1 is dented at portions where the lead plates 3 are joined, making slopes 1a at a rather acute angle. By performing the rolling with the rolls 8 having decreased diameter at both side edges, the portions in the porous metal article 1 on either side of the lead plates 3 are deformed so that the dents formed by the lead plates 3 are flattened to make a less acute slope toward other portions of the porous metal article 1 having a predetermined thickness.

In this way, the stress or strain generated in the porous metal article 1 in the region in the vicinity of the lead plates 3 due to tension towards the lead plates 3 is corrected. Therefore, electrode substrates 7 obtained by cutting the thus rolled porous metal article 1 are free of warping, and there can be no wide variations in the amount of active material applied onto the substrates. Also, troubles are less likely to happen during the transfer of the electrode substrates, and the operation rate of the production line is thereby enhanced. In this embodiment, moreover, warp or distortion of resultant electrode substrates is eliminated, while the thickness of the entire porous metal article 1 is maintained the same.

Figure 3:
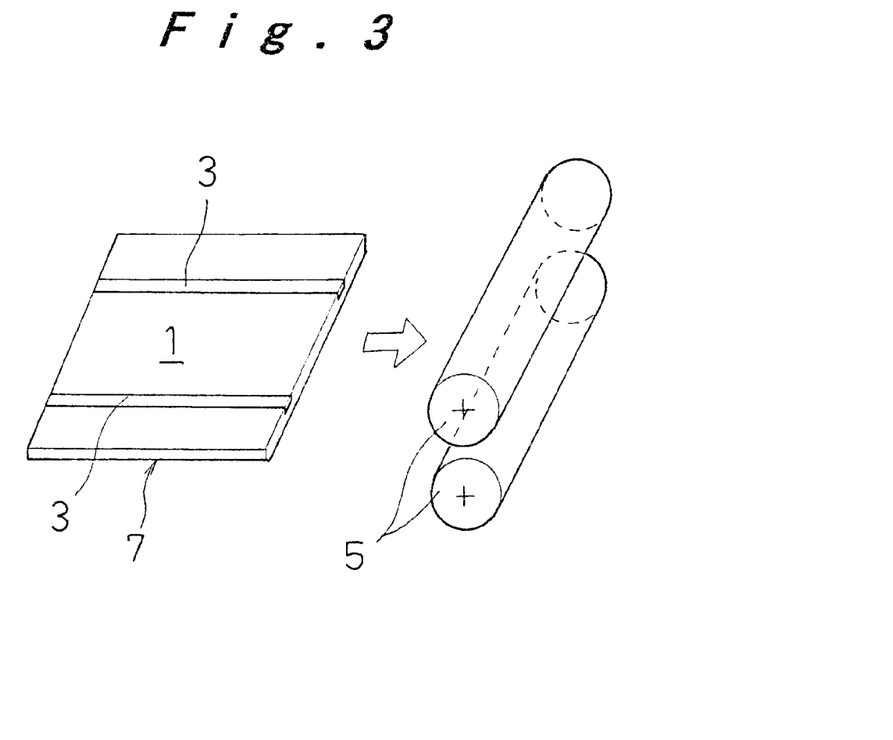
FIG. 3 is a perspective view illustrating a step of manufacturing positive electrode substrates in accordance with yet another embodiment of the present invention.

Next, a third embodiment of the present invention is described with reference to FIG. 3. In this embodiment, electrode substrates 7 after being cut from the porous metal article 1 at cutting lines 6 are rolled by passing them through a pair of rolls 5.

In this embodiment, warp or distortion of electrode substrates 7 are eliminated after they have been cut from the porous metal article 1, as the electrode substrates are entirely rolled with the rolls 5 to correct any local stress or strain generated by the joining of the lead plates 3. In this way, same or similar benefits are obtained as in the foregoing embodiments.

Figure 4:
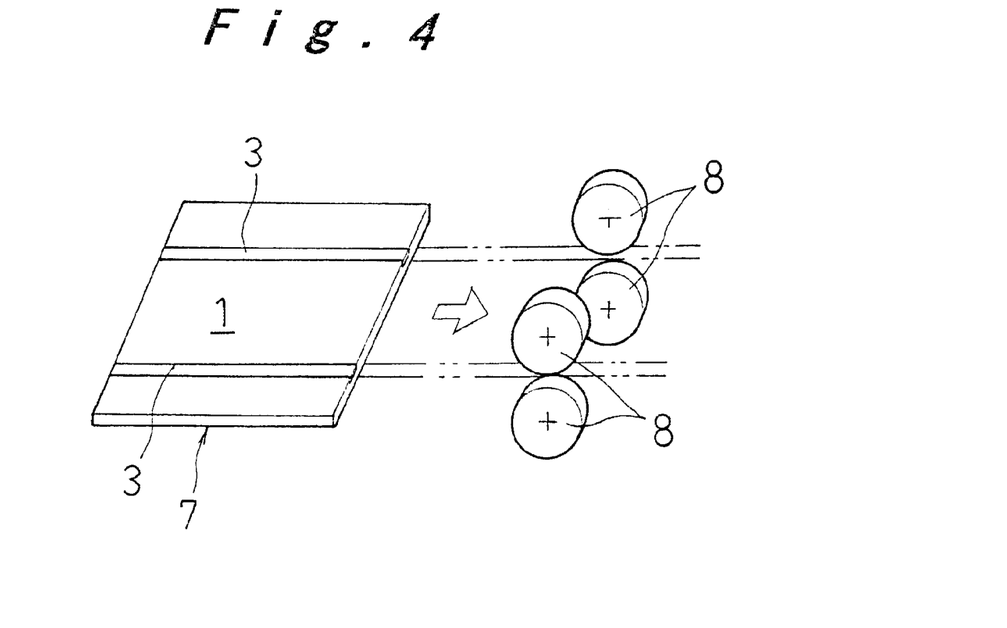
FIG. 4 is a perspective view illustrating a step of manufacturing positive electrode substrates in accordance with still yet another embodiment of the present invention.

Next, a fourth embodiment of the present invention is described with reference to FIG. 4. In this embodiment, electrode substrates 7 after being cut from the porous metal article 1 at cutting lines 6 are rolled with the pair of rolls 8 only in the vicinity of the lead plates 3.

In this way, warp or distortion of electrode substrates 7 are eliminated after they have been cut from the porous metal article 1, as the portions of the electrode substrates 7 in the vicinity of the lead plates 3 are rolled with the rolls 8 to correct any local stress or strain generated by the joining of the lead plates 3. Same or similar benefits are obtained as in the foregoing embodiments.

Figure 5:
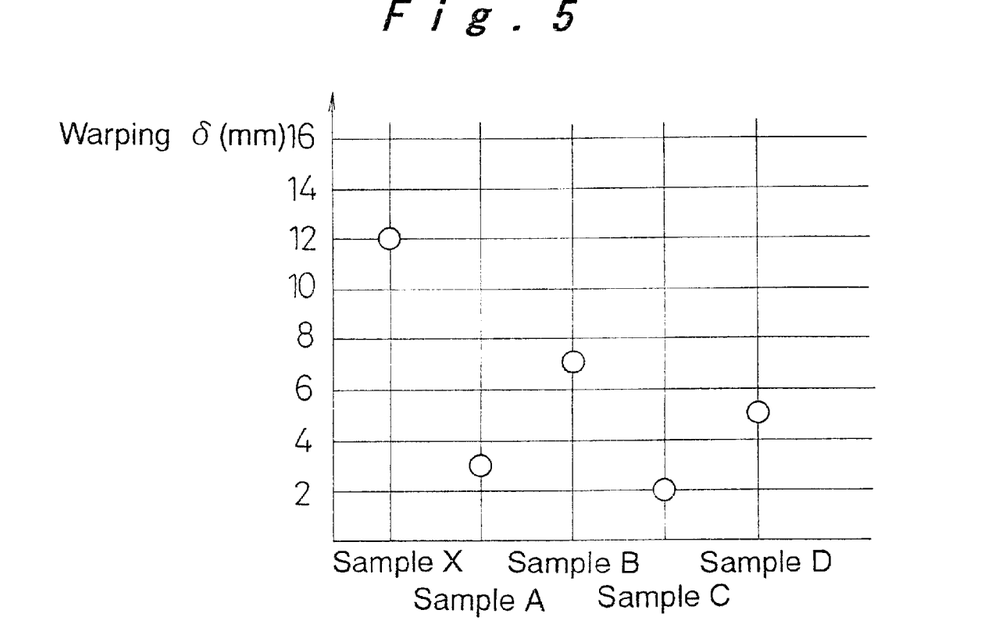
FIG. 5 is a chart showing the amount of warping of a positive electrode substrate obtained in accordance with various embodiments of the present invention as compared to a prior art example.

Specific examples of the beneficial effects obtained in accordance with the embodiments of the invention described above compared with the prior art example are illustrated in FIG. 5 to FIG. 8. FIG. 5 shows the amount of warping observed in electrode substrates. Sample X was prepared in accordance with prior art method, while samples A, B, C, and D were prepared respectively in accordance with the above described first to fourth embodiments of the invention. As shown, the warping observed in sample X was 12 mm, whereas it was 3 mm in sample A, 7 mm in sample B, 2 mm in sample C, and 5 mm in sample D. From the above results it can be seen that greater benefits are obtained by rolling the entire porous metal article 1 or electrode substrate 7 than by rolling just the vicinity of the lead plates 3, and that it is more effective to perform the rolling to the electrode substrates 7 after they have been cut out from the porous metal article 1 than to the porous metal article 1 itself. It should be noted, however, that if the entire porous metal article 1 or the electrode substrate 7 are subject to rolling, the entire thickness is also decreased, and that in order to perform the rolling to the cut-out electrode substrates 7 rather than to the porous metal article 1, the production equipment becomes bulky.

Figure 6:
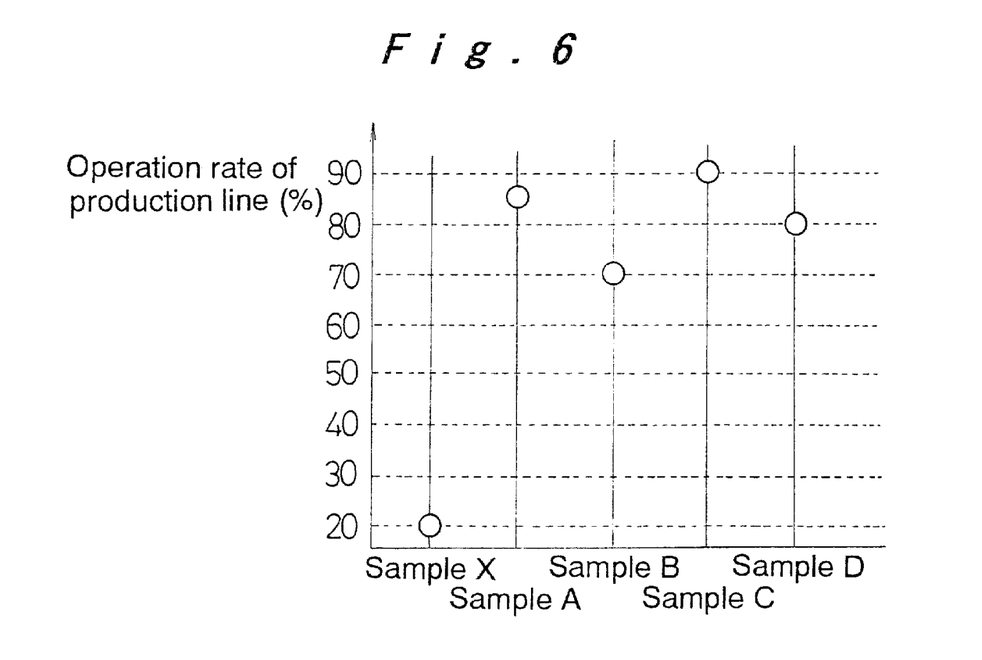
FIG. 6 is a chart showing the operation rate of production line in accordance with various embodiments of the present invention as compared to a prior art example.

FIG. 6 shows how the warping in electrode substrates affects the operation rate of production line. As shown, the operation rate with sample X was only about 20% because of the considerable warping, while it was improved to 70 to 90% with samples A, B, C, and D.

Figure 7:
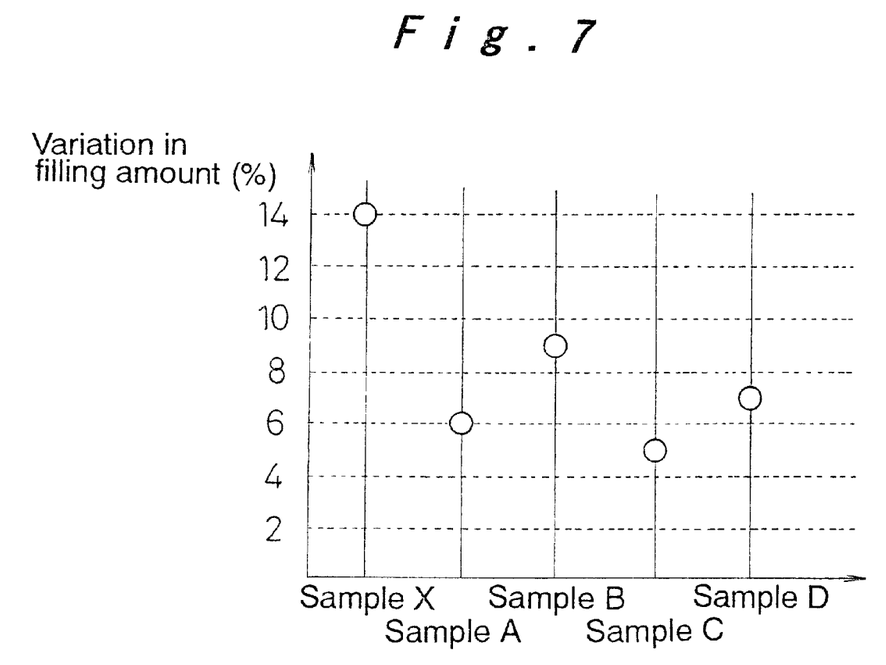
FIG. 7 is a chart showing the variation in the amount of active material applied on electrode plates in accordance with various embodiments of the present invention as compared to a prior art example.
Figure 8:
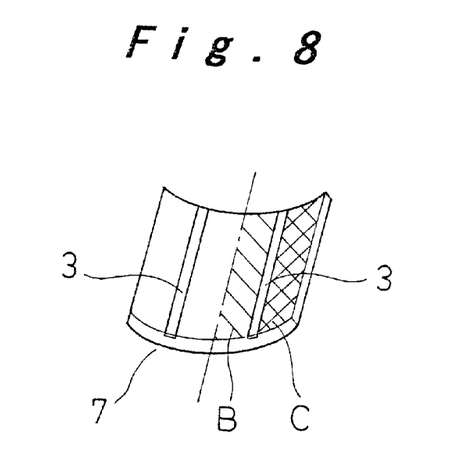
FIG. 8 is a diagram for explaining how to determine the variation in the amount of active material applied onto the positive electrode substrates.

FIG. 7 shows how the warping in electrode substrates affects the variation in the amount of active material applied onto the electrode substrates. Specifically, FIG. 7 shows the difference in the amount of active material in a middle portion B in the widthwise direction of the electrode substrate 7 and in a warped portion C on either side thereof as shown in FIG. 8. As shown in FIG. 7, sample X exhibited a high percentage of 14%, whereas the variation was reduced to 5 to 9% in samples A, B, C, and D. Accordingly, variations in the battery capacity can be reduced by using the electrode substrates prepared in accordance with the invention.

Figure 9:
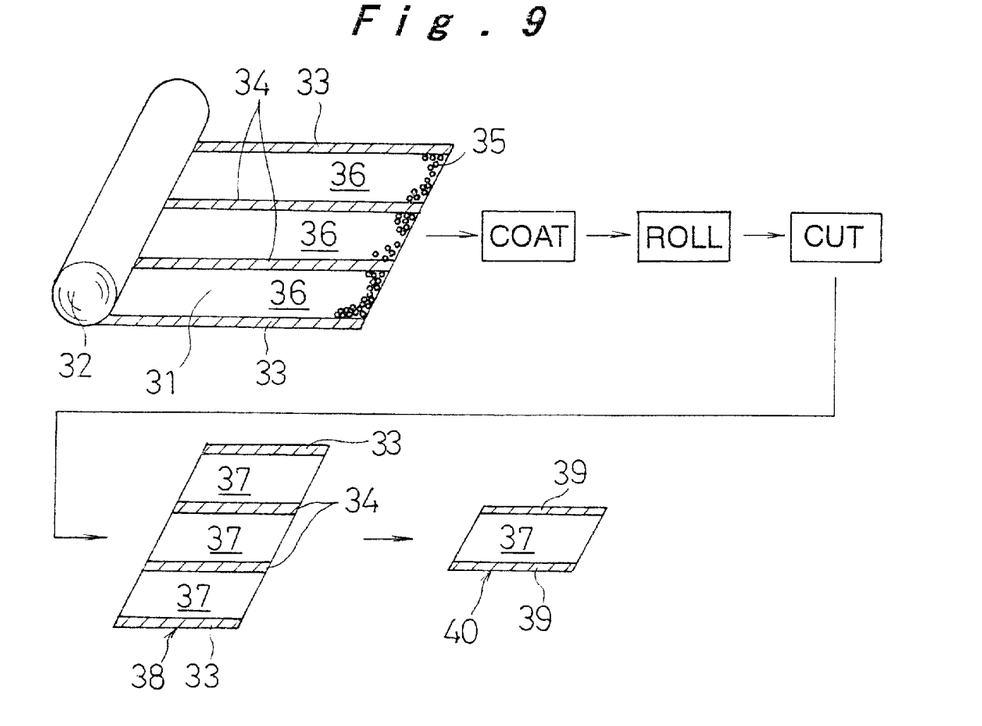
FIG. 9 is a perspective view schematically illustrating a step of manufacturing negative electrode substrates in accordance with one embodiment of the present invention.

Next, a method of preparing negative electrode substrates in accordance with the present invention will be described with reference to FIG. 9 to FIG. 13. In FIG. 9, reference numeral 31 represents a core material of negative electrode plates for nickel metal hydride batteries. The core material is composed of a strip of porous metal sheet primarily containing nickel, which is formed with a large number of pores 35, and is supplied in the form of a coil 32. The porous metal sheet 31 includes flat, solid portions 33 on both side edges where no pores are formed, and one or a plurality of middle solid portions 34 (two rows shown in the illustrated example) provided between the solid portions 33 with suitable separation, and perforated portions 36 where a large number of pores 35 are distributed between these solid portions 33 or 34.

Figure 11:
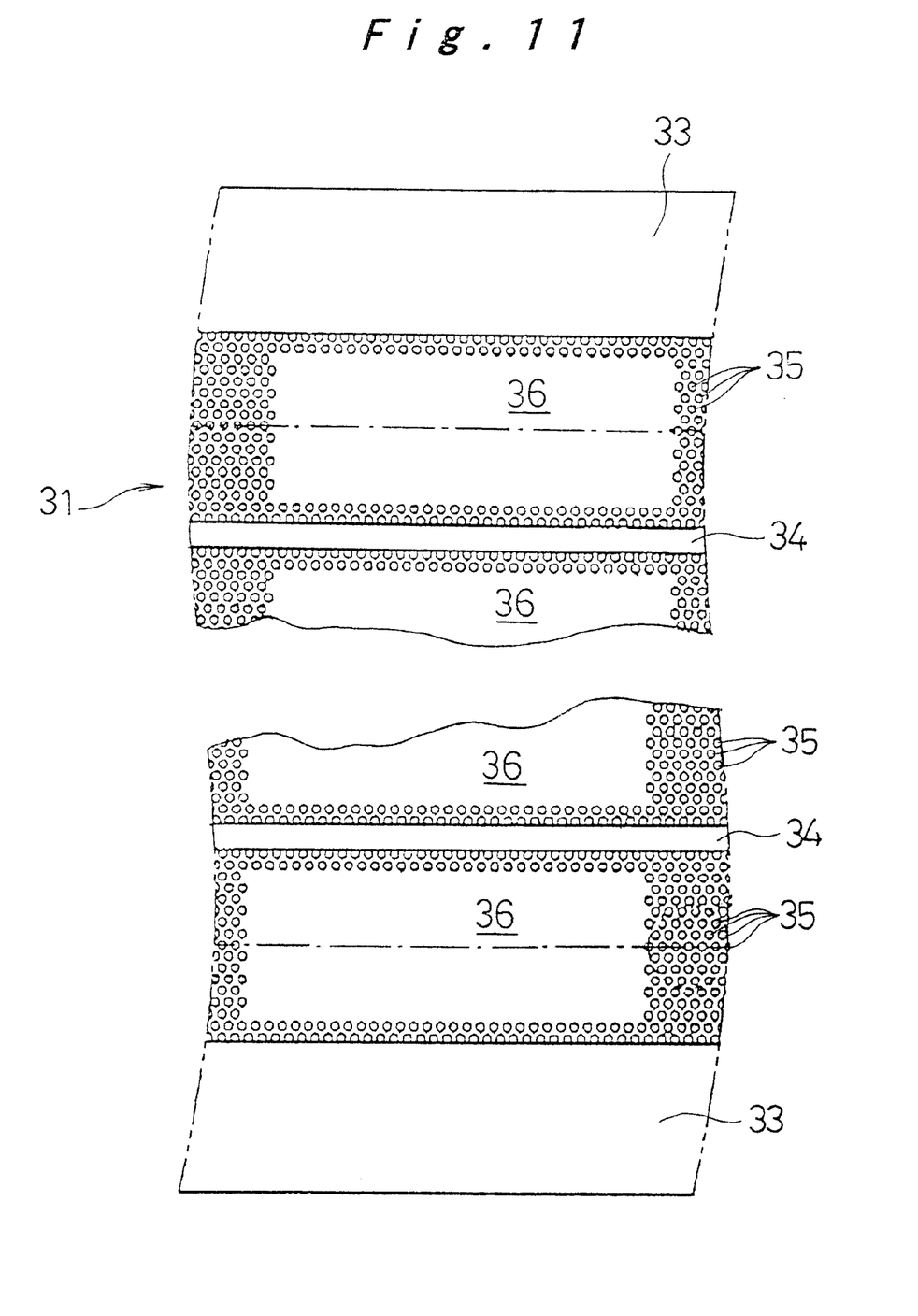
FIG. 11 is a partial plan view of a strip of porous substrate used in various embodiments of the invention.

One example of such porous metal sheet 31 is shown in greater detail in FIG. 11. In this illustrated example, the porous metal sheet 31 consists of a punched metal sheet. The solid portions 33 at both side edges of the porous metal sheet have a relatively large width of about 15 to 25 mm, for the guiding purpose of the metal sheet during transfer of the same. In the perforated portions 36, a large number of pores 35 are formed in matrix fashion with a pitch space of about 1.5 to 2 mm. At suitable locations in the perforated portions 36, there are provided a plurality of middle solid portions 34 where no pores 35 are formed for a width of several pitch spaces. It should be noted that the porous metal sheet 31 should not be limited to such punched metal sheet and may be of any kind having a similar structure.

Referring back to FIG. 9, an anode mixture obtained by mixing hydrogen-absorption alloy powder, conductor, and binder into the form of a paste is applied onto the porous metal sheet 31 paid out from the coil 32. The porous metal sheet 31 is then rolled for compressing the mixture and for adjusting the sheet to a predetermined thickness, after which the sheet 31 is divided into separate pieces of electrode substrates 38 having a predetermined width. The resultant electrode substrates 38 have coated portions 37 between the solid portions 33 and 34 as shown in FIG. 9, and these electrode substrates 38 are further divided into separate pieces of electrode plates 40 by cutting them at the solid portions 33, 34, so that the resultant electrode plates 40 have solid portions 39 at both side edges thereof.

In accordance with the invention, as described above, the porous metal sheet 31 is formed with one or a plurality of rows of solid portions 34 between the solid portions on both side edges of the sheet. Therefore, the variance in the stretch of the porous metal sheet 31 when it is rolled between the side portions and the middle portion is reduced as compared to a case wherein the porous metal sheet is provided with solid portions at only side edges thereof. Accordingly, the resultant electrode substrates 38 cut out from the porous metal sheet 31 are substantially free of warping. As a result, the electrode plates 40 obtained in accordance with the invention are substantially flat and free of defects caused by peeling of anode mixture paste, short-circuits, or troubles when being inserted into battery cases.

Figure 10:
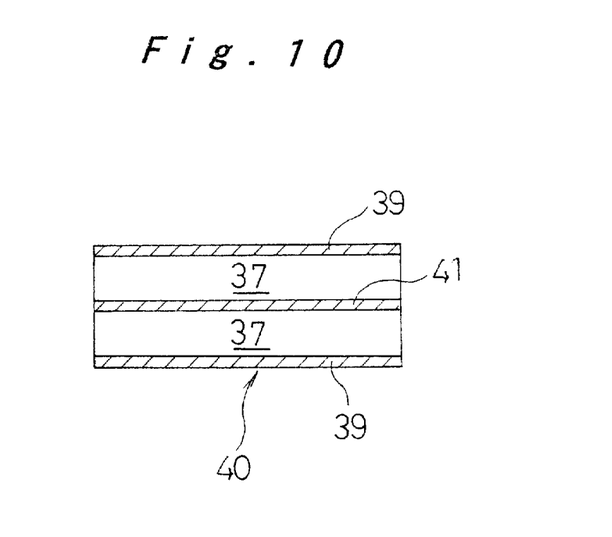
FIG. 10 is a plan view of a negative electrode substrate obtained in accordance with another embodiment of the present invention.

The width of the solid portions 33 or 34 and the pitch space between two solid portions may be variously altered. For example, the intervals between the solid portions 33 on both sides of the sheet and the middle solid portions 34 may be set much shorter than the example illustrated in FIG. 9 or FIG. 11, so that when cut out from the electrode substrates 38, the resultant electrode plates 40 will have side solid portions 39 and at least one middle solid portion 41, as illustrated in FIG. 10. In this way, the porous metal sheet 31 can be rolled out much more evenly, and any warping or distortion in the resultant electrode plates can be completely eliminated.

Figure 12:
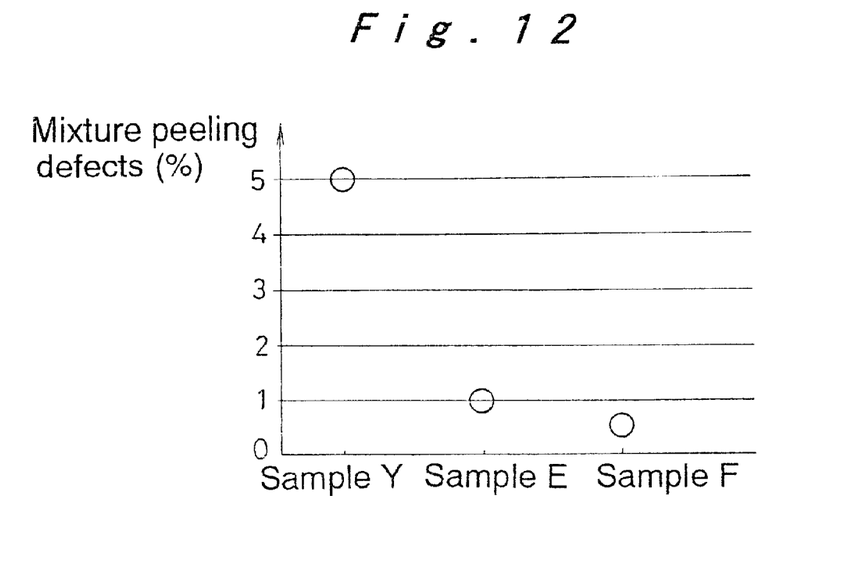
FIG. 12 is a chart showing the percentage of defects caused by peeling of anode mixture from substrates in accordance with various embodiments of the present invention as compared to a prior art example.
Figure 13:
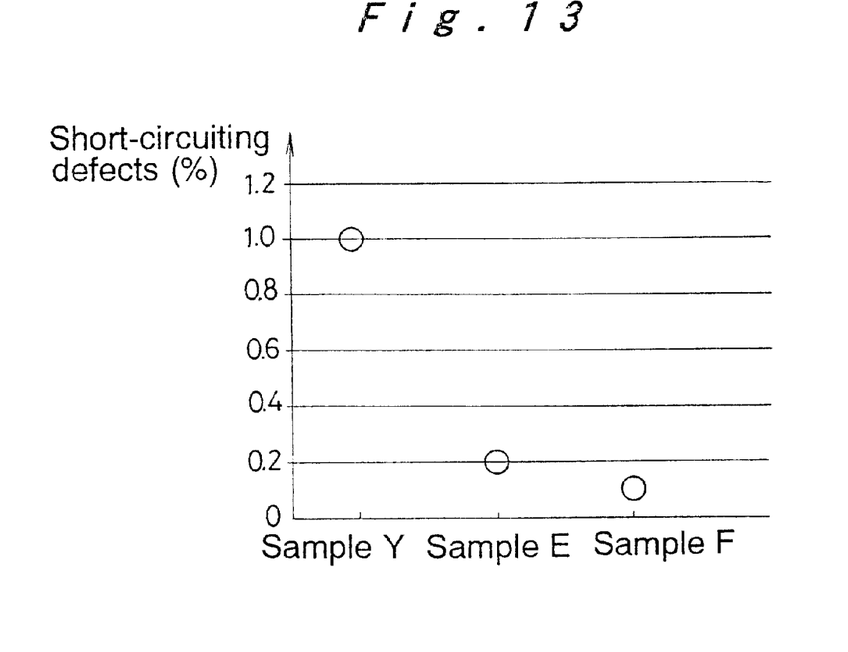
FIG. 13 is a chart showing the percentage of short-circuit observed in batteries prepared in accordance with the methods of various embodiments of the present invention as compared to a prior art example.

FIG. 12 shows the percentage of peeling of anode mixture from the electrode plates, observed in sample Y of negative electrode plates prepared in accordance with prior art method and in samples E and F prepared in accordance with the above described embodiments of the invention. FIG. 13 shows the percentage of short-circuits which occurred in battery units prepared using samples Y, E, and F, respectively.

For evaluating the mixture peeling defects, the condition of the electrode plates were visually observed after they were cut out from the substrates. As shown in FIG. 12, mixture peeling defect happened at 5% rate in sample Y, whereas it is decreased to 0.5 to 1% in samples E and F.

For evaluating the short-circuiting defects, electrode plate groups for nickel metal hydride batteries were prepared respectively using four negative electrode plates of samples Y, E, and F, and three positive electrode plates and separators both prepared in accordance with a known method, and their resistance values were measured. As shown in FIG. 13, the short-circuiting defect was observed in sample Y at 1% rate, whereas it is decreased to 0.1 to 0.2% in samples E and F.

Accordingly, it was ascertained that the method of preparing negative electrode plates in accordance with the present invention is effective to improve battery performance.

It should be noted that the above described methods of preparing positive or negative electrode plates of the invention should not be limited to those for nickel metal hydride rechargeable batteries, but may be applied to all sorts of batteries.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method of manufacturing electrode plates for a battery comprising the steps of:

joining at least one strip of lead plate in a lengthwise direction to a strip of porous metal sheet having a three-dimensional structure;

cutting said porous metal sheet to a predetermined length for obtaining a plurality of electrode substrates;

rolling said plurality of electrode substrates in a vicinity of said strip of lead plate;

coating said electrode substrates with an active material for the battery; and cutting said electrode substrates coated with the active material to a predetermined length for obtaining a plurality of electrode plates such that the resultant electrode plates have said lead plate at one side edge thereof.

2. A method of manufacturing electrode plates for a battery comprising the steps of:

joining at least one strip of lead plate in a lengthwise direction to a strip of porous metal sheet having a three-dimensional structure;

cutting said porous metal sheet to a predetermined length for obtaining a plurality of electrode substrates;

rolling said plurality of electrode substrates entirely to flatten out the electrode substrates to a predetermined thickness;

coating said electrode substrates with an active material for the battery; and cutting said electrode substrates coated with the active material to a predetermined length for obtaining a plurality of electrode plates such that the resultant electrode plates have said lead plate at one side edge thereof.

* * * * *